US005482141A

United States Patent [19]

Wilson

[11] Patent Number: 5,482,141

[45] Date of Patent: Jan. 9, 1996

[54] FORKLIFT TRUCK

[75] Inventor: Frederick G. Wilson, Lisburn, Northern Ireland

[73] Assignee: Wilson Double Deck Trailers Limited, County Armagh, Northern Ireland

[21] Appl. No.: 295,202

[22] Filed: Aug. 24, 1994

[30] Foreign Application Priority Data

Aug. 25, 1993 [GB] United Kingdom .................. 9317628

[51] Int. Cl.$^{6}$ ........................ B60P 3/00

[52] U.S. Cl. ................ 187/225; 414/635; 280/401; 180/208

[58] Field of Search ................ 414/467, 630, 414/631, 632, 634, 635, 637, 638, 673, 641, 642; 180/208; 280/287, 278, 401; 187/225, 226, 222; 254/2 R

[56] References Cited

U.S. PATENT DOCUMENTS

| | | | |
|---|---|---|---|
| 3,374,909 | 3/1968 | Ferwerda | 187/225 X |
| 3,710,965 | 1/1973 | Joosten . | |
| 3,799,379 | 3/1974 | Gretner et al. | 414/467 |
| 3,908,849 | 9/1975 | Carroll | 414/634 |
| 4,207,967 | 6/1980 | Stedman | 414/634 X |
| 4,460,064 | 7/1984 | Lutz et al. | 414/467 X |

FOREIGN PATENT DOCUMENTS

| | | | |
|---|---|---|---|
| 86522/75 | 5/1977 | Australia . | |
| 571233 | 3/1959 | Belgium | 414/631 |
| 1148019 | 12/1957 | France | 414/632 |
| 1401141 | 4/1965 | France . | |
| 2215380 | 1/1974 | France . | |
| 1431488 | 4/1969 | Germany | 414/632 |
| 102946 | 11/1963 | Norway | 414/632 |
| 1008918 | 11/1965 | United Kingdom . | |
| WO95/05994 | 3/1995 | United Kingdom . | |
| 2281279 | 3/1995 | United Kingdom . | |

*Primary Examiner*—Frank E. Werner

*Attorney, Agent, or Firm*—Woodcock Washburn Kurtz Mackiewicz & Norris

[57] ABSTRACT

A forklift truck has a chassis structure with at least two sections 11, 12 hinged together for pivotting between an open working configuration and a closed stowage configuration.

5 Claims, 2 Drawing Sheets

FORKLIFT TRUCK

This invention relates to forklift trucks, in particular but not exclusively to demountable forklift trucks to be stowed at the rear of a vehicle and used to load or to unload the vehicle.

Demountable forklift trucks are well known. The truck is usually stowed on the vehicle by securing its forks to the vehicle and then elevating the body of the truck off the ground for travel.

It is desirable that the demountable forklift be as short as possible when attached to the vehicle to minimise stress to the vehicle chassis.

According to the present invention there is provided a forklift truck comprising an overhead chassis structure having a front section carrying a pair of front wheels and a mast and a rear section carrying at least one rear wheel, wherein in a working configuration of the truck the front section extends downwardly and forwardly relative to the rear section which is hinged at its top to the front section and wherein the truck is convertible to a stowage configuration by folding the front section against the mast and the rear section against the front section.

Figure 1:
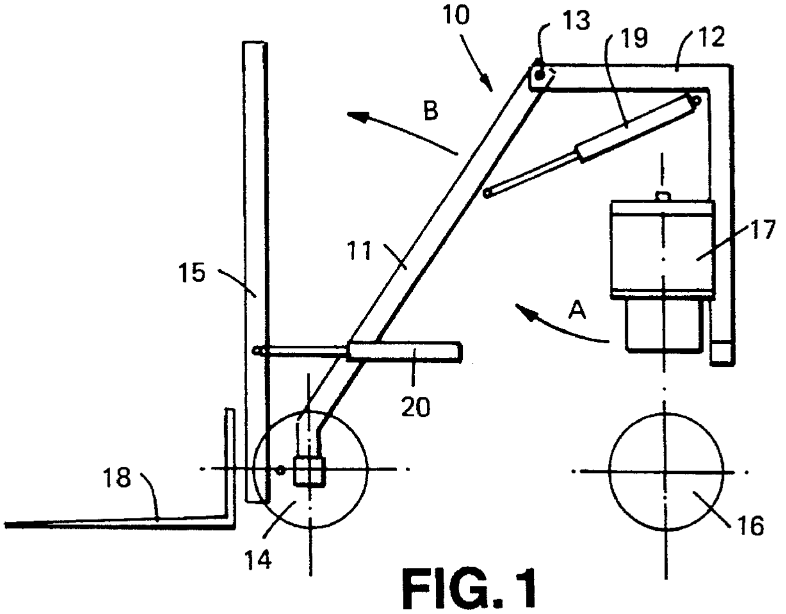
Figure 2:
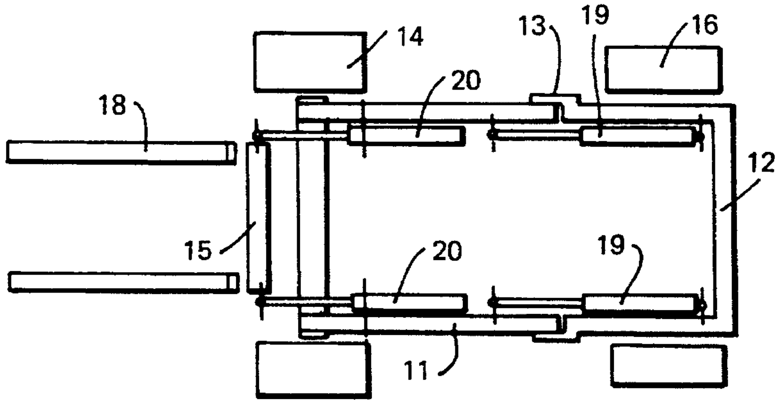
Figure 3:
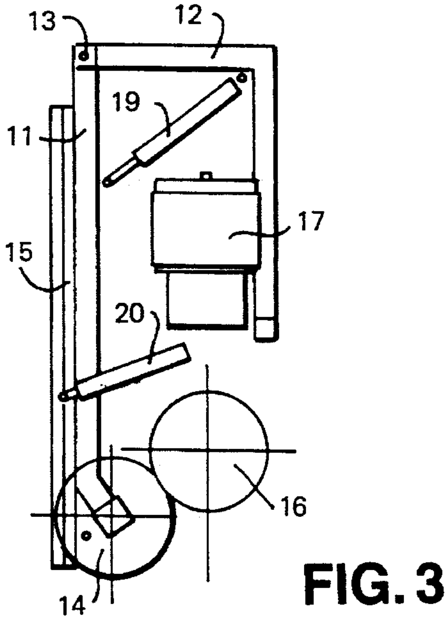
Figure 4:
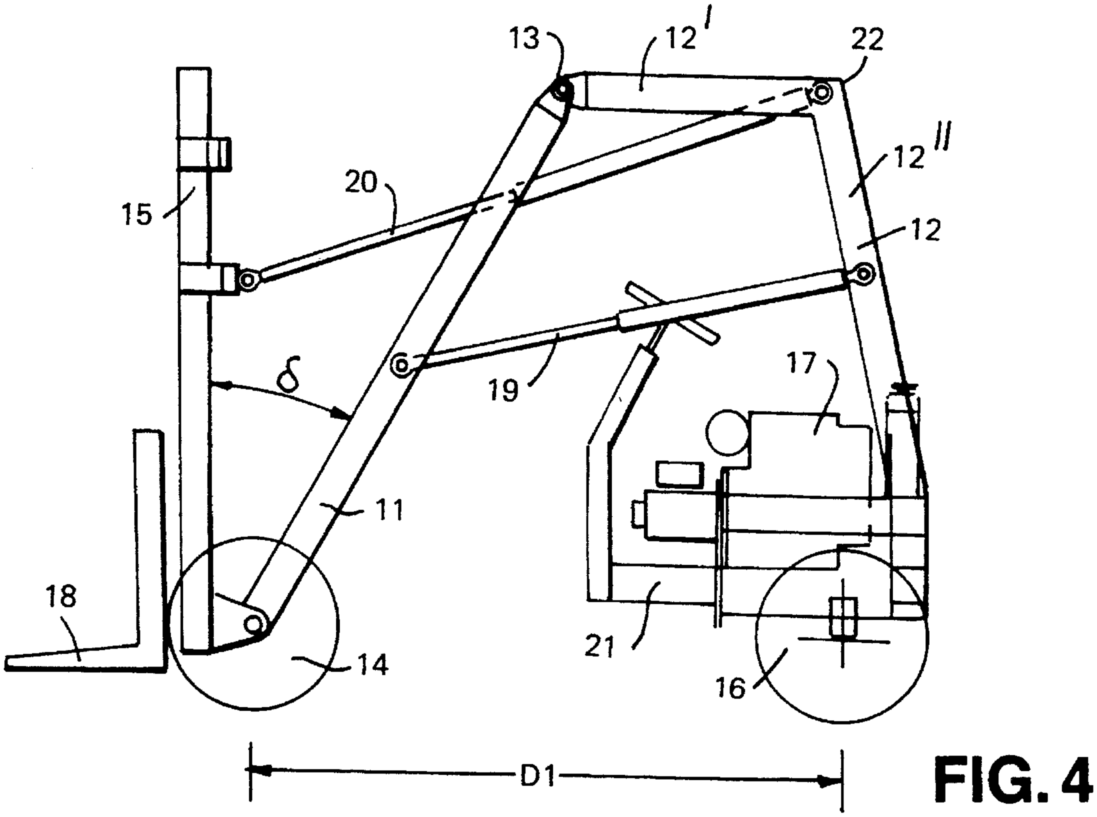
Figure 5:
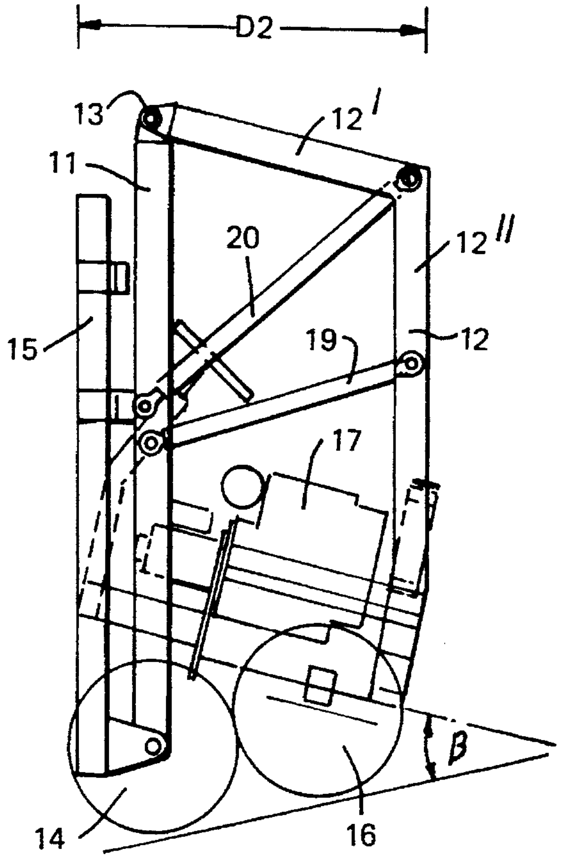

Embodiments of the invention will now be described, by way of example, with reference to the accompanying drawings, in which:

FIG. 1 is a side elevation of a first embodiment of demountable forklift truck with its chassis structure in the working configuration, FIG. 2 is a plan view of the forklift truck of FIG. 1 in the working configuration, FIG. 3 is a side elevation of the forklift truck of FIG. 1 mounted on a vehicle with its chassis structure in the stowage configuration, FIG. 4 is a side elevation of a second embodiment of demountable forklift truck with its chassis structure in the working configuration, and FIG. 5 is a side elevation of the forklift truck of FIG. 4 with its chassis structure in the stowage configuration, Referring to FIGS. 1 to 3 of the drawings, the forklift truck has an overhead chassis structure 10 with front and rear sections 11 and 12 respectively which are hinged together at 13 for pivoting between an open working configuration (FIGS. 1 and 2) and a closed stowage configuration (FIG. 3).

In particular, the front section 11 carries a pair of front wheels 14 and a substantially vertical mast 15 and the rear section 12 carries a pair of rear wheels 16 and a power unit 17, the top of the front section 11 being hinged at 13 to the top of the rear section 12 and extending forwardly and downwardly from the top of the rear section to the base of the mast in the working configuration. To bring the chassis structure 10 to the stowage configuration the rear section 12 is pivotted towards the front section 11 in the direction of the arrow "A", bringing the front wheels close to the rear wheels (FIG. 3).

Also, the base of the front section 11 is hinged relative to the base of the mast 15, so that the front section 11 is pivotable towards the mast 15 in the direction of the arrow "B" so that it can be brought from the working configuration shown in FIG. 2 to lie substantially vertically up against the mast in the stowage configuration. The mast 15 carries lifting forks 18 in conventional manner.

The result is that in moving from the working configuration to the stowage configuration the front and rear sections 11 and 12 pivot concertina-fashion towards the mast 15.

As seen in FIG. 3, in the stowage configuration the rear wheels 16 lie adjacent and at least partially above the front wheels 14. However, if the distance apart of the rear wheels is made sufficiently less than the distance apart of the front wheels, it is possible to design the chassis structure so that the pair of rear wheels lie at least partly between the pair of front wheels in the stowage configuration.

To effect the movement of the front and rear sections 11, 12 and the mast 15 from the working configuration shown in FIGS. 1 and 2 to the stowage configuration shown in FIG. 3 at least one double acting hydraulic ram 19 is connected between the front and rear sections for pivoting the rear section relative to the front section and at least one hydraulic ram 20 is connected between the mast and the front section for pivoting the front section relative to the mast.

In the working configuration of the forklift truck for lifting and carrying goods the rams 19 and 20 are extended so that the front and rear sections 11, 12 of the chassis 10 and the mast 15 assume the relative positions shown in FIG. 2 so that the section 11 is downwardly and forwardly inclined and the mast 15 is approximately vertical.

To fix the demountable forklift truck to a vehicle the forklift is driven against the vehicle and the forks 18 secured thereto. Then the rams 19 and 20 are retracted bringing the rear wheels 16 and power unit 17 towards the front wheels 14 and at the same time pivoting the front section 11 up against the mast 15. Then the elevating means built into the forklift mast raise the forklift truck body to travelling height.

FIGS. 4 and 5 show a second embodiment of the invention which differs from the first embodiment primarily in that the ram 20 is connected between the mast 15 and the rear section 12 rather than between the mast 15 and the front section 11. In this case the truck is converted from the working configuration of FIG. 4 to the stowage configuration of FIG. 5 by retracting both rams 19 and 20 simultaneously. Also in FIGS. 4 and 5, the two parts 12' and 12" of the rear section 12 are arranged at a slight obtuse angle rather than substantially at a right angle as in the first embodiment, 3, so that in the working configuration the apex 22 of the angle between the two parts 12' and 12", at or near which the ram 20 is attached, lies above the power unit 17 rather than behind it as seen in FIG. 1.

In this second embodiment, the wheelbase D1 in the working configuration is about 2080 mm and the angle delta between the mast 15 and the front section 11 is about 31 degrees. In the stowage configuration the overall front to rear dimension D2 of the truck is about 1236 mm and the angle beta between the tangent to the wheels and the platform 21 which supports the power unit 17 (which is substantially horizontal in the working configuration) is about 25 degrees.

In both the first and second embodiments the wheelbase of the truck can be varied in the working configuration to move the power unit 17, which constitutes the main counterweight to the load carried by the forks 18, towards or away from the front wheels 14 in accordance with the weight to be carried at any given time. This is effected by extending or retracting the ram 19, and in the second embodiment the ram 20 may also be adjusted to counter any tilt of the mast caused thereby.

Various modifications to the foregoing embodiment are possible within the scope of the invention. For example, there could be one central rear wheel 16 rather than a pair as shown.

I claim:

1. A forklift truck comprising an overhead chassis structure having a front section carrying a pair of front wheels and a rear section carrying at least one rear wheel, a top of the front section being hinge about a horizontal axis to a top of the rear section, a mast carried by and hinged about a horizontal axis at its base to a base of the front section and forks vertically movable along the mast, wherein the truck is convertible by motive means from an open working configuration in which the front section extends downwardly and forwardly relative to the rear section to a closed stowage configuration in which the front section is folded in a first direction of rotation substantially vertically against the mast and the rear section is folded in an opposite direction of rotation against the front section.

2. A forklift truck as claimed in claim 1, wherein in the stowage configuration the rear wheel(s) are adjacent the pair of front wheels.

3. A forklift truck as claimed in claim 2, wherein the rear wheel(s) lies at least partially above the pair of front wheels in the stowage configuration.

4. A forklift truck as claimed in claim 1, wherein the motive means is a hydraulic ram connected between the front and rear sections for folding the rear section against the front section.

5. A forklift truck as claimed in claim 1, wherein the motive means is a hydraulic ram connected between the mast and the chassis structure for folding the front section against the mast.

* * * * *